United States Patent [19]

Bergman

[11] 4,247,121

[45] Jan. 27, 1981

[54] PISTON ROD SEAL

[76] Inventor: Ulf C. Bergman, Vendelfridsgatan 6 B, 217 64 Malmö, Sweden

[21] Appl. No.: 4,834

[22] Filed: Jan. 19, 1979

[30] Foreign Application Priority Data

Feb. 2, 1978 [GB] United Kingdom ................ 4338/78

[51] Int. Cl.³ .............................................. F16J 15/56
[52] U.S. Cl. ........................................... 277/3; 277/15
[58] Field of Search ....................... 277/3, 15, 29, 116; 92/86

[56] References Cited

U.S. PATENT DOCUMENTS

| | | | |
|---|---|---|---|
| 3,810,634 | 5/1974 | Hakansson | 92/86 |
| 3,848,877 | 11/1974 | Bengtsson et al. | 277/3 |
| 4,083,566 | 4/1978 | Bengtsson et al. | 277/3 |
| 4,146,237 | 3/1979 | Bergman | 277/3 |
| 4,170,363 | 10/1979 | Bergman | 277/3 |

Primary Examiner—Robert I. Smith
Attorney, Agent, or Firm—Finnegan, Henderson, Farabow, Garrett & Dunner

[57] ABSTRACT

Leakage of gas is prevented by an oil seal established as an oil reservoir surrounding a piston rod. The reservoir is limited by spring-influenced plastic rings arranged in a seal housing. The springs are located at the low gas pressure side of the seal. Oil is supplied to the piston rod surface at the low pressure side of the seal.

4 Claims, 1 Drawing Figure

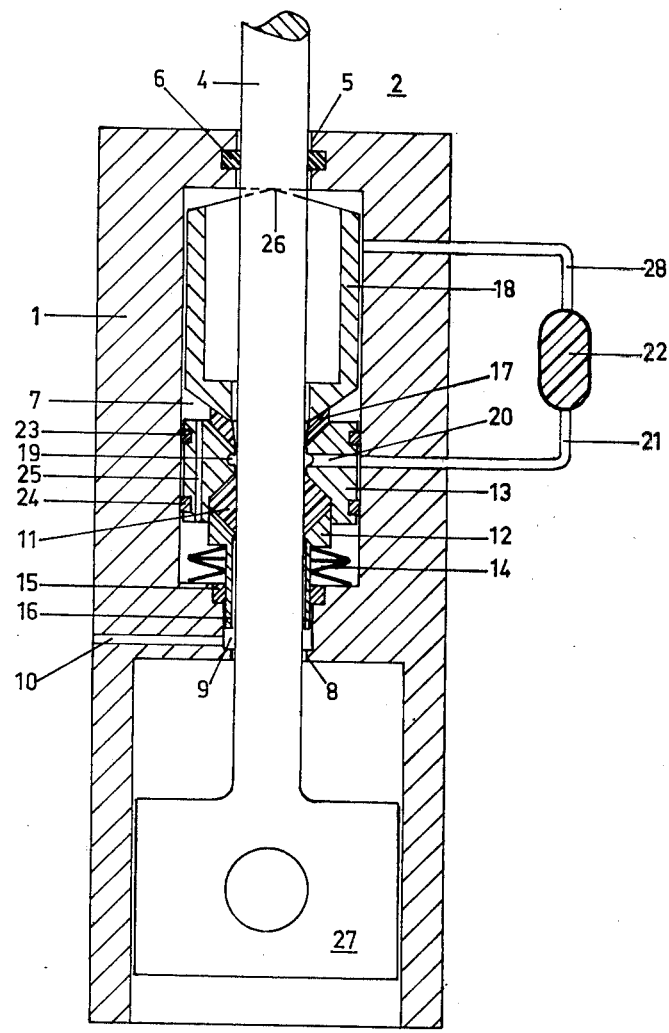

PISTON ROD SEAL

PRIOR ART

U.K. Pat. No. 1,496,986 (corresponding to U.S. appl. Ser. No. 803,786)
U.K. Pat. No. 148,797 (corresponding to U.S. appl. Ser. No. 702,185)
U.S. Pat. No. 3,848,877
U.S. Pat. No. 4,083,566
U.S. Pat. No. 3,810,634
U.S. Pat. No. 3,865,015

This invention relates to a construction of the kind (herein called "the kind defined") comprising sealing means for preventing gas leakage along a rectilinearly-reciprocating piston rod, a wall through which the piston rod extends, a high pressure gas chamber at one side of said wall, a low pressure gas chamber at the other side of said wall, and a scraper ring which is arranged to prevent transfer of oil along the piston rod into the high pressure gas chamber and is included in the sealing means, the latter being disposed in a part of said wall and surrounding the piston rod.

United Kingdom Pat. No. 1,496,986 discloses and claims a construction of the kind defined, characterized in that said scraper ring adjoins an oil-collecting space provided with oil outlet means furnished with a valve which allows oil to pass through the oil outlet means only when the pressure within the oil-collecting space exceeds the pressure of the gas within the said high pressure gas chamber, and it is stated that preferably the oil-collecting space is also adjoined by a resilient sealing gland, the latter is continuously forced against the piston rod, and there are means for supplying oil to the surface of the piston rod adjacent to and on the low pressure side of the side gland.

United Kingdom Pat. No. 1,458,797 discloses and claims a scraper ring for removing oil from a convex cylindrical surface which reciprocates rectilinearly in the direction of the axis of the cylindrical surface relative to the scraper ring, the latter being made wholly or partially of material which is plastically deformable when the scraper ring is in use, the scraper ring having four co-axially disposed annular surfaces, namely an outer peripheral surface, an inner frusto-conical surface which is wider than the outer peripheral surface, and two conically-tapering surfaces of unequal angles of conicity and of which one is wider than the other, the wider one of the conically-tapering surfaces meeting the inner frusto-conical surface at an acute angle at an edge which is at the smallest diameter of the inner frusto-conical surface.

The invention claimed in Specification No. 1,458,797 also includes such a scraper ring in combination with a compression device comprising two elements movable relative to each other in the axial direction of the scraper ring, the latter being held between the said two elements, one of the two elements having an abatement surface complementary to and abutting the wider one of the conically-tapering surfaces of the scraper ring, the other one of the two elements having an abutment surface complementary to and abutting the other one of the conically-tapering surfaces of the scraper ring, and resilient means loading one of the two elements so that the scraper ring is subject to compressive force between the two elements.

One object of the present invention is to provide a construction of the kind defined such that it is possible to avoid the use of a relief and drain valve for regulating the pressure in and escape of oil from an oil-collecting space.

According to the present invention a construction of the kind defined is characterized by a combination including a stationary housing mounted in said wall and having oil-feed means inducing around said piston rod in the lower pressure region a film of oil, oil-collecting means including an annular groove extending around said piston rod in a position between said high pressure gas chamber and said lower pressure gas chamber, and biassing means maintaining axially-directed compressing forces on rings and a sealing gland included in said sealing means, the said biassing means and said rings and gland being clamped between a shoulder surface provided in the said stationary housing in the vicinity of the high pressure gas chamber and a further shoulder surface provided in the housing near the low pressure gas chamber, the biassing means abutting said further shoulder surface.

It is very advantageous if the said biassing means is disposed abutting the said further shoulder surface near the low pressure gas chamber, and the biassing means preferably comprises belleville spring washers.

How the invention may be put into practice is described in more detail below with reference to the accompanying diagrammatic drawing which shows a construction according to the invention in vertical section.

The illustrated construction comprises a housing 1 forming part of a wall (not shown) separating a chamber 2 containing gas at a high pressure from a space or chamber 3 containing gas at a substantially lower pressure. A piston rod 4 extends through an opening in the housing 1. The said opening includes an upper cylindrical part 5 containing a sealing ring 6 made of plastics material, preferably polytetrafluoroethylene. The said opening also includes an intermediate cylindrical cavity 7 of larger diameter and a lower cylindrical part 8 containing a groove 9 for lubricating and cooling oil which is supplied through a channel 10. A resilient sealing gland 11 made of fibreglass-reinforced polytetrafluoroethylene surrounds the piston rod 4. The gland 11 is wedged between metal rings 12 and 13. The lower metal ring 12 engages a stack of belleville spring washers 14 resting against a lower shoulder surface forming part of the boundary of the cavity 7. A rubber O-ring 15 prevents leakage of gas to the chamber 3 from the cavity 7 between the housing 1 and a cylindrical downwardly extending sleeve 16 forming a part of the ring 12. The rings 12 and 13 have conically tapering surfaces to engage the gland 11, and the force of the belleville spring washers 14 is constantly transmitted through said conically tapering surfaces so that the gland 11 is always forced against the piston rod 4.

A scraper ring 17 made of polytetrafluoroethylene is wedged between conically tapering surfaces respectively on the upper ring 13 and on a sleeve 18 engaging an upper shoulder surface forming part of the boundary of the cavity 7. The cone top angle of the conical surface on the upper ring 13 engaging the scraper ring 17 is somewhat smaller than the cone top angle of the conical surface of the sleeve 18. Thus the scraper ring 17, which is subjected to and transmits the force of the belleville spring washers 14, is wedged into contact with the piston rod 4. The scraper ring 17 is as described in United Kingdom Pat. No. 1,458,797. The ring 6 does not have any substantial sealing effect, but it ensures that the pressure inside the cavity 7 corresponds at least approximately to the mean pressure in the chamber 2 in case pressure variations occur in said chamber 2, which will be the case if the chamber 2 is a working chamber of a hot gas engine.

The ring 13 is provided with an annular groove 19, and a radial channel 20 connects this annular groove 19 with a further channel 21 leading to a chamber 22 containing a compressible plastic material, preferably that commercially available under the Du Pont Registered Trade Mark "Adiprene". Two O-rings 23 and 24 prevent leakage between the cavity 7 and the oil-collecting space formed by the groove 19 and the channels 20, 21. An axial bore 25 in the ring 13 ensures that equal pressures prevail on both sides of the ring 13 in the cavity 7.

The upper end of the sleeve 18 is shaped so that it abuts the shoulder surface of the housing 1 substantially along a line 26 which is substantially perpendicular to the principal direction of the forces acting upon a cross-head 27 forming the lower part of the piston rod 4.

A conduit 28 connects the cavity 7 with the chamber 22, at the end thereof remote from the connection of the channel 21 to the chamber 22.

The illustrated construction operates as follows.

During operation the piston rod 4 reciprocates in its axial direction. Oil is supplied through the channel 10, and an oil film is formed on the surface of the rod 4. Most of this oil film is wiped off by the gland 11, but a thin layer of oil is drawn through the gland 11 and reaches the groove 19. The scraper ring 17 does not allow oil to pass, and thus at a low rate oil continuously accumulates in the oil-collecting space comprising the groove 19, the channels 20 and 21 and the chamber 22 compressing the plastics material in the chamber 22. However, during the reciprocating motion of the rod 4 the sealing effect of the gland 11 will vary substantially. During the downward movement of the rod 4 the force of the belleville spring washers 14 is partially counteracted by the friction between the gland 11 and the rod 4. During each upward movement of the rod 4 the gland 11 is forced against the ring 13 with a force somewhat more than the force solely due to the belleville spring washers 14. The oil pressure in the groove 19 therefore reaches only a maximum limit, and after this limit is reached oil will be pressed back under the gland 11 at the same rate at which it is supplied to the groove 19.

The force of the belleville spring washers may be 800 N in a typical application of the illustrated construction in which the medium to be sealed is hydrogen having a mean pressure about 10 MPa in the chamber 2. In this application the diameter of the rod 4 is 12 mm and the length of its stroke is 40 mm. The number of strokes per minute is 4000, and the magnitude of the oil pressure in the groove 19 is about 10 MPa. The oil used is SAE 10-40 and its temperature 80 degrees centigrade.

During operation of the illustrated construction the cross-head 27 makes very small lateral or rocking movements while compressing and expanding the oil film at its guiding surfaces. Such small movements cause corresponding deformations of the rubber rings 15, 23 and 24 and a rocking movement of the sleeve 18 about a fulcrum along the line 26. These small movements have no adverse influence upon the functioning of the sealing means.

It will be understood that in practice the housing consists of several parts to facilitate manufacture and assembly, and that the drawing is simplified for the sake of clarity.

The chamber 22 need not be initially completely filled with compressible material, and as the gas pressures are equal on both sides of the ring 13 the rings 23 and 24 can be omitted provided that there is adequate sealing at the junction of the channels 20 and 21, means more elaborate than the rings 6 and 15 may be employed to prevent or limit escape of gas from the chamber 2 to the chamber 3, and various other modifications may be introduced within the scope of the invention as defined in the following claims.

What we claim is:

1. A construction of the kind having sealing means for preventing gas leakage along a rectilinearly-reciprocating piston rod, a wall through which the piston rod extends, a high pressure gas chamber at one side of said wall, a low pressure gas chamber at the other side of said wall, and a scraper ring which is arranged to prevent transfer of oil along the piston rod into the high pressure gas chamber and is included in the sealing means, the latter being disposed in a part of said wall and surrounding the piston rod, the construction further comprising:

a combination including a stationary housing mounted in said wall and having oil-feed means inducing around said piston rod in the lower pressure gas chamber a film of oil, oil-collecting means including an annular groove extending around said piston rod in a position between said high pressure gas chamber and said lower pressure gas chamber, and biassing means maintaining axially-directed compressing forces on rings and a sealing gland included in said sealing means, the said biassing means and said rings and gland being clamped between a shoulder surface provided in the said stationary housing in the vicinity of the high pressure gas chamber and a further shoulder surface provided in the housing near the low pressure gas chamber, the biassing means abutting said further shoulder surface.

2. A construction according to claim 1, wherein a cross-head is located in the lower pressure gas chamber, said piston rod extending through parts of said housing with radial play, and a sleeve abutting the said shoulder surface in the vicinity of the high pressure gas chamber substantially along a line perpendicular to the principal direction of the forces influencing the cross-head.

3. A construction according to claim 1, wherein the biassing means includes belleville spring washers.

4. A construction according to claim 1 wherein said oil-collecting means includes a chamber containing a compressible medium and there is a conduit leading to the said chamber containing a compressible medium to ensure that the pressure of said medium is substantially equal to the pressure of the gas tending to leak along the piston rod.

* * * * *

UNITED STATES PATENT AND TRADEMARK OFFICE
CERTIFICATE OF CORRECTION

PATENT NO. : 4,247,121
DATED : January 27, 1981
INVENTOR(S) : ULF C. BERGMAN

It is certified that error appears in the above—identified patent and that said Letters Patent is hereby corrected as shown below:

At column 1, line 5, delete "148,797" and insert therefor --1,458,797--; and

At column 2, line 8, change "lower pressure region" to --lower pressure gas chamber--.

Signed and Sealed this

Fourth Day of August 1981

[SEAL]

Attest:

Attesting Officer

GERALD J. MOSSINGHOFF

Commissioner of Patents and Trademarks